UNITED STATES PATENT OFFICE.

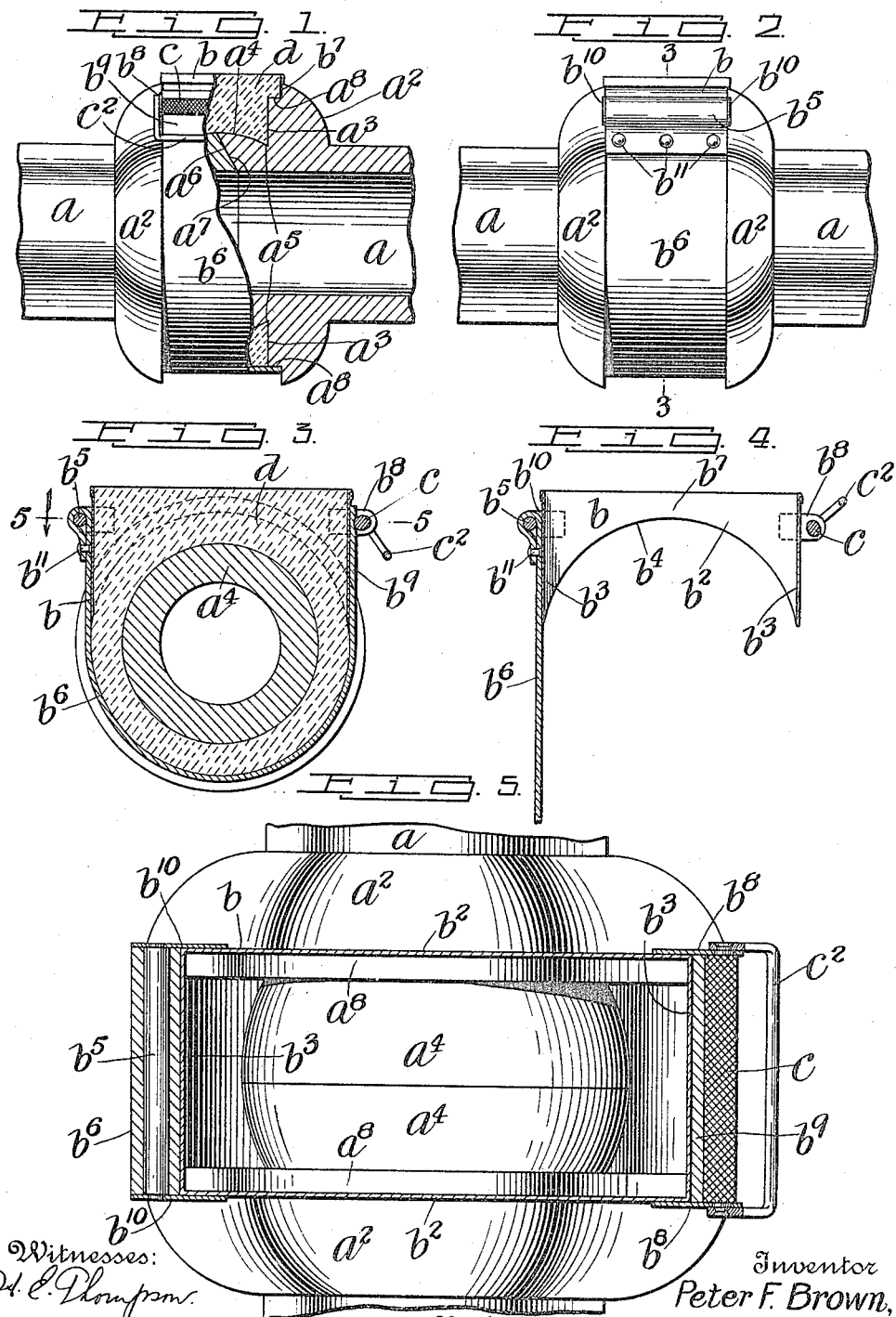

PETER F. BROWN, OF HUNTINGTON, NEW YORK, ASSIGNOR OF ONE-HALF TO CLARENCE R. IRWIN, OF HUNTINGTON, NEW YORK.

COUPLING FOR TILE PIPES.

1,231,700.

Specification of Letters Patent.

Patented July 3, 1917.

Application filed March 23, 1916. Serial No. 86,299.

*To all whom it may concern:*

Be it known that I, PETER F. BROWN, a citizen of the United States, and residing at Huntington, L. I., in the county of Suffolk and State of New York, have invented certain new and useful Improvements in Couplings for Tile Pipes, of which the following is a specification, such as will enable those skilled in the art to which it appertains to make and use the same.

This invention relates to couplings or joints for tile pipes used as water pipes, drainage pipes, sewer pipes and the like; and the object thereof is to provide an improved coupling or joint of this class which is simple in construction, efficient in use and which is comparatively inexpensive and which will exclude both water and air and form a safe and reliable coupling or joint.

The invention is fully disclosed in the following specification, of which the accompanying drawing forms a part, in which the separate parts of my improvement are designated by suitable reference characters in each of the views, and in which:—

Figure 1 is a side view partly in section showing my coupling and the method of making the same;

Fig. 2 an opposite side view of the device as shown in Fig. 1;

Fig. 3 a section on the line 3—3 of Fig. 2;

Fig. 4 a sectional detail view of a mold box or casing which I employ in making my improved coupling; and, Fig. 5 a partial section on the line 5—5 of Fig. 3 and on an enlarged scale.

In the drawing forming part of this specification, I have shown at $a$ two tile pipe sections to be coupled, and in the practice of my invention, the ends of said pipe sections to be coupled or connected are provided with enlarged annular heads $a^2$ having similar flat annular faces $a^3$ and central annular projecting members $a^4$ which are beveled or rounded on their outer surfaces to form deep annular grooves $a^5$. One of the central projecting members $a^4$ has an outwardly beveled extension $a^6$ adapted to fit in an inwardly beveled annular recess $a^7$ formed in the other projecting member $a^4$. This forms, as will be seen, a tongue and groove connection or equivalent construction for the separate pipe section, but my invention is not limited to a tongue and groove construction of any specific form and any suitable construction of this class may be employed.

The faces $a^3$ of the head members $a^2$ are also provided at their outer edges with deep annular rabbet grooves $a^8$. I also provide a mold box or casing $b$ consisting, in the form of construction shown, of two opposite sides $b^2$ and two front and back members $b^3$, these terms being employed simply for the purpose of describing said mold box or casing. Said mold box or casing is preferably composed of sheet metal but may be composed of any suitable material and the bottom edges of the opposite side members $b^2$ are provided with deep arc-shaped recesses $b^4$, and at the back of said mold box or casing is secured a transverse keeper $b^5$ with which is connected a flexible strap $b^6$, preferably composed of fibrous material, but which may be composed of any suitable material. In the practice of my invention the ends of the pipe sections $a$ to be coupled are abutted as shown in Fig. 1, after which the mold box or casing $b$ is dropped down onto the heads $a^2$ of the pipe sections to be coupled, as shown in Figs. 1 and 3, in which operation the top parts $b^7$ of the opposite side members $b^2$ of the mold box or casing fit in the rabbet grooves $a^8$ at the top of the heads $a^2$ of the pipe sections, and the opposite sides of said mold box or casing rest in said grooves.

The front of the mold box or casing is provided with projecting ears $b^8$ in which is mounted a transverse cam shaft $c$ having a yoke-shaped handle $c^2$ and after the mold box or casing has been placed in position, as shown in Figs. 1 and 2, the strap $b^6$ is passed downwardly beneath and around the abutting parts of the heads $a^2$ and through the rabbet grooves $a^8$, and the free end portion $b^9$ of said strap is passed upwardly between the front member $b^3$ of the mold box or casing and the cam-shaft $c$, after which the cam-shaft $c$ is turned by means of the handle $c^2$ thereof so as to securely clamp and hold the end $b^9$ of the strap $b^6$ as shown in Fig. 3.

After the mold box or casing of which the strap $b^6$ forms a part has been placed in position, as herein shown and described, a suitable liquid cement $d$ is poured thereinto, the top thereof being opened, and said cement flows down into the bottom of said mold box or casing and gradually rises therein and around the abutting parts of the heads $a^2$ of the pipe sections to be coupled until the mold box or casing is entirely filled therewith, after which the cement is allowed to set or become hard, and thus securely locks or binds the pipe sections together as will be readily understood.

The cement which I prefer to use in the above described operation is preferably a bituminous compound, this form of cement being employed for the purpose of making an absolute air and water tight joint. When this form of cement is used I also coat or cover the abutting members of the heads $a^2$ of the pipes to be coupled, and the faces $a^3$ with liquid asphaltum or similar material to aid in producing the desired result, it being understood that the bituminous compound or cement will adhere more readily to the surfaces named when said surfaces have been coated with asphaltum, as stated.

By pouring the cement gradually into the mold box or casing in the above described operation, all air and moisture is forced out of said mold box or casing as the cement rises therein, and a perfectly air and water tight joint is produced.

In a companion application prepared and filed by me of equal date herewith, Serial No. 86,298, I have shown and described a pipe coupling similar in all respects to that shown and described herein, except for the form and construction of the mold box or casing $b$, and the method of its use and to which the invention described and claimed herein is limited. This invention is not limited to any particular form for the abutting members $a^6$ of the heads $a^2$ of the pipe sections to be coupled, nor to any particular form of the face portions $a^3$ of said heads, all that is necessary in this connection being to provide said heads with suitable projecting and abutting members, and with the annular grooves $a^8$ in which the parts of the mold box or casing fit, when said mold box or casing is in position for use.

The transverse keeper $b^5$, in the form of construction shown, consists of a rod mounted in ears $b^{10}$ secured to the sides of the mold box or casing and the strap $b^6$ is passed around said rod and riveted as shown at $b^{11}$, and while I have specified that the strap $b^6$ may be composed of any suitable material I prefer that it be made of cotton fiber or asbestos in order that it will withstand the temperature at which the cement consisting of a bituminous compound is poured in the mold box or casing.

The cam-shaft $c$ may be of any preferred construction but, in practice, I prefer to mill the surface thereof, as indicated in Fig. 5, so that it will grasp and hold the strap $b$ and draw it tightly into position.

Another feature distinguishing the construction described and claimed herein from that of the companion application above referred to is found in the fact that the mold box or casing described in said companion application forms a permanent part of the coupling, whereas in this case the mold box or casing may be detached after the cement binder has set or become hard, and said mold box or casing may be used for forming any number of joints or couplings in the manner shown and described.

Having fully described my invention, what I claim as new and desire to secure by Letters Patent, is:—

1. The herein described means for coupling or connecting the ends of tile pipes provided with enlarged annular heads formed on the ends of said pipes and provided with projecting and abutting members having annular grooves in their outer surfaces, said heads being also provided in their adjacent faces and at their perimeters with annular rabbet grooves, comprising a mold box or casing rectangular in form in cross section and open at the top and bottom and opposite sides of which are provided in their bottom edges with arc-shaped recesses, and a flexible strap member connected with one side of said mold box or casing at right angles to the sides in which said arc-shaped recesses are formed, said mold box or casing being adapted to be placed on said heads with the arc-shaped recesses in opposite sides thereof fitting in the top portions of said rabbet grooves, and said strap being adapted to be passed beneath and around said heads and to fit in the bottom and side portions of said rabbet grooves and detachably secured to the opposite side of said mold box or casing.

2. The herein described device for use in forming a coupling or connection for the ends of tile pipes, comprising a mold box or casing rectangular in form in cross section and open at the top and bottom and opposite sides of which are provided in their bottom edges with arc-shaped recesses, and a flexible strap connected with one side of said mold box or casing at right angles to the sides having said arc-shaped recesses and adapted to be detachably secured to the opposite side of said mold box or casing.

3. The herein described means for use in coupling or connecting the ends of tile pipes provided with enlarged annular heads having projecting and abutting members in the outer surfaces of which are annular grooves, said heads being also provided in their adjacent faces and at their perimeters with annular rabbet grooves, comprising a mold box or casing rectangular in form in cross section and open at the top and bottom, the opposite sides of which are provided in their bottom edges with arc-shaped recesses, and a flexible strap connected with one side of the mold box or casing at right angles to the sides having the arc-shaped recesses, said mold box or casing being adapted to be placed on said heads with the arc-shaped recesses fitting in the top portions of said rabbet grooves, and said strap being adapted to be passed beneath and around said head and to fit in the bottom and side portions of said rabbet grooves.

In testimony that I claim the foregoing as my invention I have signed my name in presence of the subscribing witnesses this 21st day of March, 1916.

PETER F. BROWN.

Witnesses:
C. MULREANY,
H. E. THOMPSON.

Copies of this patent may be obtained for five cents each, by addressing the "Commissioner of Patents, Washington, D. C."